Reissued Sept. 27, 1932

Re. 18,609

UNITED STATES PATENT OFFICE

CHARLES HART, OF MEDIA, PENNSYLVANIA, ASSIGNOR OF ONE-HALF TO PETER SHIELDS, OF WASHINGTON, DISTRICT OF COLUMBIA

PROCESS OF TREATING ORES IN THE MANUFACTURE OF RUSTLESS STEEL

No Drawing. Original No. 1,826,932, dated October 13, 1931, Serial No. 484,712, filed September 26, 1930. Application for reissue filed December 10, 1931. Serial No. 580,230.

The present invention relates to the treatment of ores, whereby certain constituent parts of the ores become concentrated and certain other constituent parts of the ores become partially removed, so that the relative ratio of the second class of metals, to the first class of metals, is increased.

The process is applicable to many ores containing two or more different kinds of metal, and a particular ore to which I call attention is a Cuban ore, consisting largely of ferric oxide in a hydrated condition. An analysis of this ore showed one sample to contain about 46% of iron, about 2% of silica, about 8% of alumina, about 1.7% of chromium, abut 0.5% of nickel, and about 12% of water. Another somewhat similar ore contained around 46.75% of iron, 6% of silica, 12% of alumina, 1.85% of chromium, 1% of nickel and around 11% of water. The ores also contained small amounts of manganese, lime, soda, sulphur compounds and potassium. A similar ore found in a different location is known as "laterite". These ores are cited merely as examples of ores which may be treated in accordance with the present invention. Chromium and nickel, as found in these ores are found to be less readily chloridized, than is iron, and the process accordingly embraces the step of heating the ore to a temperature at which chloridization of the ore can be effected, say by means of chlorine gas of a gas containing chlorine (which may be in the elemental condition if desired) although it is possible to effect the chloridization by other methods, although probably less advantageously. Reducing the ore, for the production of hot metal from which stainless steel can readily be produced by a direct method, is not readily possible for the reason that the content of chromium and nickel in the ore is insufficient and it is not always readily possible to enrich the hot metal in chromium and nickel, to the required extent.

Accordingly I give the following method by which this result can readily be secured.

A quantity of ore is placed in a retort, and is heated in any suitable manner to a temperature of between 400 and 500° C., and a stream of gas containing free chlorine is passed through the charge of ore so heated. More or less reducing agent may be added at the beginning of the operation, which will assist in the chloridization of the ore, by the method set forth. Under these conditions, a substantial portion of the iron content of the ore will vaporize, and after continuing the treatment for about an hour and a half, it will be found that there has been a material change in the ratio between iron present and nickel and chromium present, due to the volatilization of iron chloride from the ore. It will be understood that the volatilization is somewhat more rapid at temperatures substantially higher than here indicated, but there is likely to be more loss of the chromium and nickel, by volatilization. In this connection it may be noted that both chromium and nickel are capable of conversion into chlorides and vaporization in the form of chlorides, but under the preferred temperature conditions, the material vaporized will be largely iron, in the form of ferric chloride, accompanied by extremely small amounts of the chlorides of chromium and nickel, so that analysis of the ore after the treatment will show a substantial increase in the ratio of chromium and nickel to iron.

Having thus concentrated the ores in chromium and nickel, other materials suitable for furnishing alloy constituents may be added, these being added either in the form of crude ores or concentrates. For example, after the chloridization treatment, other chromium ores can be added to the ore, and other nickel ores can be added. I also contemplate adding ores of other metals such as zirconium which are useful in the production of alloy steels of the kind referred to. Ordinarily I would not recommend adding the zirconium ores to the initial ore prior to chloridization, for the reason that the chloridization treatment might carry away a substantial proportion of the zirconium, which of course as recognized is relatively high priced material.

After the chloridization treatment and after the addition of other ores as above indicated, the charge may be smelted in a suitable furnace, such as a blast furnace, to obtain a hot metal having a comparatively high percentage of chromium and nickel, and optionally zirconium, from which a high grade of rustless steel can be made. It will be understood that any of the usual blast furnace procedures can be employed, such as first briquetting the ores if desired, the use of suitable amounts of fuel and fluxing agents, such as lime and the like, or the ore could be reduced in another manner instead of in a blast furnace. During the smelting operation, some of the oxide of iron, most of the silica and alumina and perhaps small quantities of the oxides of chromium and nickel might pass into the slag, but the main portions of the chromium and nickel, together with a part of the iron would be reduced to the metallic state, and the zirconium if employed would likewise be reduced to the metallic condition, and would enter the hot metal.

It will be understood that the preferred temperature to be employed in the particular case naturally depends to a considerable extent upon the precise ore under treatment, and experimental runs should be made with each batch of ore to determine the most advantageous temperature for that particular ore. With the Cuban ore according to the first analysis above given, a temperature of about 480 to 490° C. will be found most satisfactory.

I claim:

1. A process which comprises heating an ore containing iron in large proportion, and chromium and nickel in far smaller quantities, which comprises heating said ore to a temperature at which ferric chloride is readily volatile, and contacting the ore with a stream of gases containing free chlorine until the iron content of the ore has been substantially lowered and the percentages of chromium and nickel content of the ore has been substantially increased and thereafter adding further quantities of chromium and nickel ores, and adding zirconium ore, then reducing the material in a furnace to produce a hot metal which is particularly suitable for the production of alloy steels.

2. A process which comprises heating an ore containing iron in large proportion, and chromium in far smaller quantity, which comprises heating said ore to a temperature at which ferric chloride is readily volatile, and contacting the ore with a stream of gases containing chlorine until the iron content of the ore has been substantially lowered and the percentage of chromium content of the ore has been substantially increased, thereafter adding a further quantity of chromium ore, adding zirconium and reducing the material in a furnace to produce a hot metal which is particularly suitable for the production of alloy steels.

3. A process for treating ores containing iron, chromium, and nickel with the iron proportion largely predominating, consisting in heating the ore to a temperature maximum of 500° C., subjecting the ore to a chloridization action to reduce the quantity of the iron without complete elimination thereof, to thereby relatively increase the proportion of chromium and nickel to that of the iron, and thereafter adding further quantities of chromium and nickel ores, and reducing the whole in a furnace.

4. A process for treating ores containing iron in large proportions and other metals in smaller quantities, which consists in heating the ore to a suitable temperature in the presence of a chloridizing agent until the percentage of iron in the ore has been substantially lowered and the percentage of such other metals has been substantially raised, increasing the percentage of such other metals by additions of the ores thereof to the charge, and smelting the residue to produce a hot metal suitable for the manufacture of alloy steels.

CHARLES HART.